(12) United States Patent
Bischofberger

(10) Patent No.: US 9,416,750 B2
(45) Date of Patent: Aug. 16, 2016

(54) PISTON FOR AN INTERNAL COMBUSTION ENGINE

(75) Inventor: Ulrich Bischofberger, Esslingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/232,666

(22) PCT Filed: Jul. 13, 2012

(86) PCT No.: PCT/DE2012/000703
§ 371 (c)(1),
(2), (4) Date: Jan. 29, 2014

(87) PCT Pub. No.: WO2013/010528
PCT Pub. Date: Jan. 24, 2013

(65) Prior Publication Data
US 2014/0230775 A1    Aug. 21, 2014

(30) Foreign Application Priority Data

Jul. 15, 2011   (DE) .......................... 10 2011 107 774

(51) Int. Cl.
*F02F 3/26*   (2006.01)
*F02B 23/06*  (2006.01)
(Continued)

(52) U.S. Cl.
CPC .............. *F02F 3/26* (2013.01); *F02B 23/0603* (2013.01); *F02B 23/0672* (2013.01); *F02F 3/14* (2013.01); *F02F 3/285* (2013.01); *F02B 2023/0612* (2013.01); *Y02T 10/125* (2013.01)

(58) Field of Classification Search
CPC ............. F02F 3/00; F02F 3/003; F02F 3/285; F02F 3/045; F02F 3/12; F02F 2200/06; F02F 3/0015; F02F 3/0084; F02F 3/08; B22D 19/0027

USPC .............. 29/888.04; 123/193.6, 193.1, 41.35; 92/222, 231, 172, 187, 189, 216, 229
See application file for complete search history.

(56) References Cited

U.S. PATENT DOCUMENTS 2,473,254 A    6/1949  Morris
2,909,160 A  * 10/1959  Dickson .................... F16J 9/22
                                                    123/303

(Continued)

FOREIGN PATENT DOCUMENTS

DE        1 032 600 B    6/1958
DE       21 36 594 A1    2/1972
(Continued)

OTHER PUBLICATIONS

Ceramasis—Graphite Material grades and specifications, http://www.ceramisis.com/carbons_graphites_specs.htm. Date searched via Wayback Machine http://web.archive.org/web/*/http://www.ceramisis.com/carbons_graphites_specs.htm. See attached "Creamisis Graphite_Reference.pdf".*

(Continued)

*Primary Examiner* — Lindsay Low
*Assistant Examiner* — Long T Tran
(74) *Attorney, Agent, or Firm* — Collard & Roe, P.C.

(57) ABSTRACT

A piston for an internal combustion engine includes a piston head that has a piston crown, a top land, a ring part, and a combustion bowl with a bowl base, a bowl wall, and an insert which is made of an annular component and which is held in the piston head by means of an undercut section. According to the invention, the component has an inner wall on the bowl side, the inner wall continuously tapering off all the way to the bowl wall or the bowl base in a flush manner, thereby forming a circumferential edge that tapers into a point.

5 Claims, 2 Drawing Sheets

Figure 1:
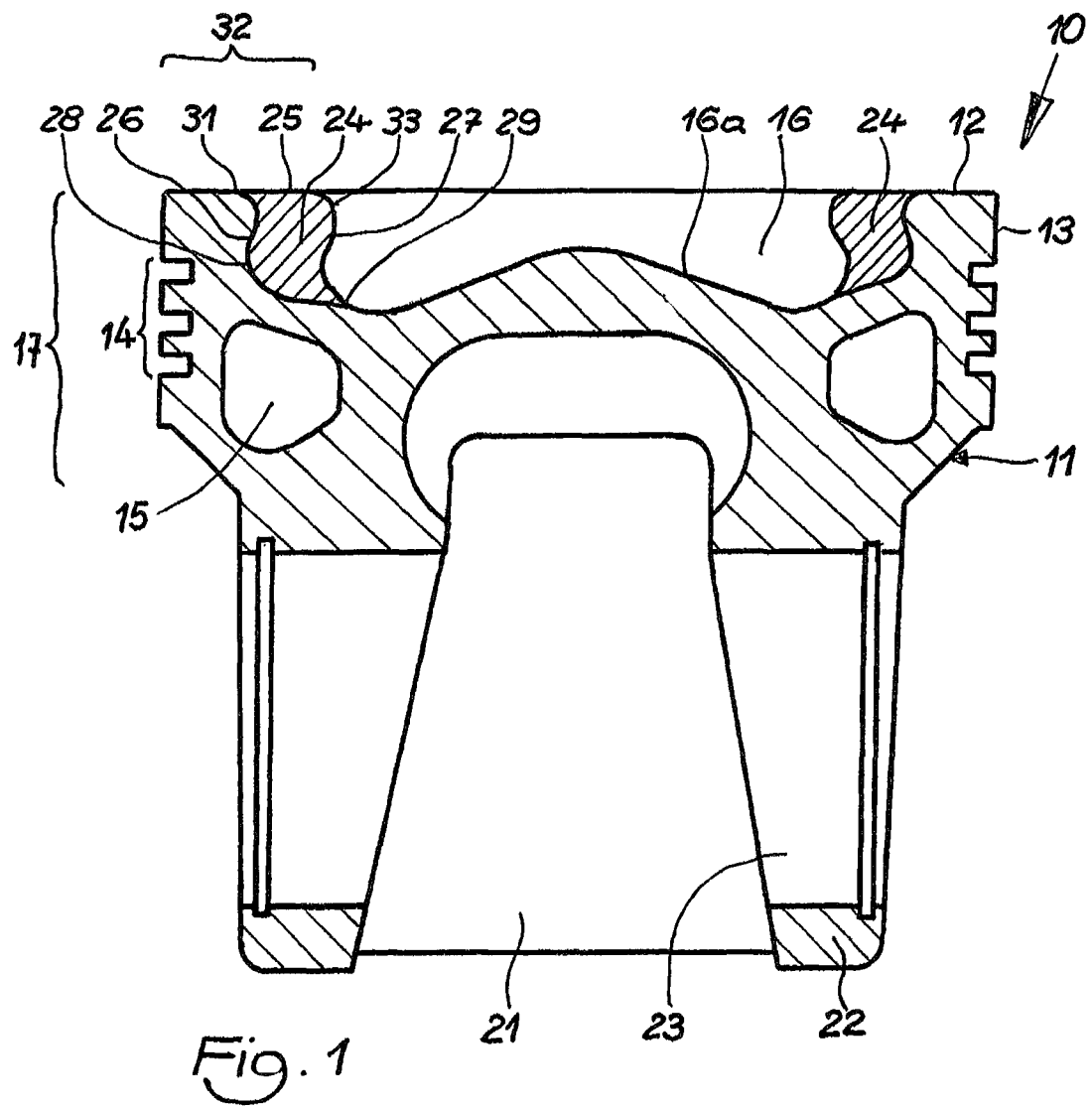

(51) Int. Cl.
*F02F 3/28* (2006.01)
*F02F 3/14* (2006.01)

(56) References Cited

U.S. PATENT DOCUMENTS

| | | | | |
|---|---|---|---|---|
| 3,596,571 | A * | 8/1971 | Hill | B23K 20/129 |
| | | | | 123/193.6 |
| 3,730,163 | A | 5/1973 | Elsbett et al. | |
| 4,213,438 | A | 7/1980 | Elsbett et al. | |
| 5,511,521 | A | 4/1996 | Bischofberger et al. | |
| 5,560,334 | A * | 10/1996 | Daxer | F02B 23/0603 |
| | | | | 123/193.6 |
| 5,660,156 | A * | 8/1997 | Whitacre | B22D 19/0027 |
| | | | | 123/193.6 |
| 5,809,962 | A * | 9/1998 | Abbott | B22D 19/0027 |
| | | | | 123/193.6 |
| 7,380,536 | B2 * | 6/2008 | Issler | F02B 23/0621 |
| | | | | 123/276 |
| 2006/0049035 | A1 * | 3/2006 | Hosenfeldt | C23C 14/024 |
| | | | | 204/192.15 |
| 2011/0155091 | A1 * | 6/2011 | Kollotzek | B22C 9/105 |
| | | | | 123/193.6 |

FOREIGN PATENT DOCUMENTS

| | | |
|---|---|---|
| DE | 25 45 588 A1 | 4/1977 |
| DE | 43 40 267 A1 | 6/1995 |
| DE | 10 2005 061 060 A1 | 6/2007 |
| FR | 2 237 064 A1 | 2/1975 |
| JP | S63-255550 A | 10/1988 |
| JP | H04-71770 U | 6/1992 |

OTHER PUBLICATIONS

Ceramasis—Graphite Material grades and specifications, httpL// www.ceramiss.com/carbons_graphites_specs.htm Date searched via Wayback Machine http://web.archive.org/*/http://www.ceramsis.com/carbons_graphites_specs.htm. See attached "Ceramasis Graphit_Reference.pdf".*
International Search Report of PCT/DE2012/000703, mailed Nov. 16, 2012.
German Search Report dated Mar. 20, 2012 in German Application No. 10 2011 107 774.3 with English translation of relevant parts.

* cited by examiner

PISTON FOR AN INTERNAL COMBUSTION ENGINE

CROSS REFERENCE TO RELATED APPLICATIONS

This application is the National Stage of PCT/DE2012/000703 filed on Jul. 13, 2012, which claims priority under 35 U.S.C. §119 of German Application No. 10 2011 107 774.3 filed on Jul. 15, 2011, the disclosures of which are incorporated by reference. The international application under PCT article 21(2) was not published in English.

The present invention relates to a piston for an internal combustion engine, having a piston head that has a piston crown, a top land, a ring belt, and a combustion bowl having a bowl base, a bowl wall, as well as an insert formed from a ring-shaped component, which is held in the piston head by means of an undercut.

A piston of the stated type is known from the documents DE-AS 1 032 600 and DE 43 40 267 A1. These pistons have a bowl edge reinforcement that is formed from a ring-shaped component and is held in the piston head by means of an undercut.

However, it has been shown that during stress due to changes in temperature of the piston during engine operation, cracks in the material of the piston head can occur behind the component, and these lead to premature failure of the piston.

The task of the present invention consists in further developing a piston of the stated type in such a manner that the risk of crack formation in the piston head in the region of the component that forms the bowl edge reinforcement is reduced.

The solution consists in that the component has an inner wall on the bowl side, which wall runs out flush and continuously with the bowl base.

The configuration, according to the invention, of the component that forms the bowl edge reinforcement in the piston head reduces the risk of gap formation in the region of the bowl base, which occurs because of the different thermal expansion coefficients of the materials of the piston head and the component, as the result of stress due to changes in temperature of the piston during engine operation. Independent of the materials used and their temperature coefficients, the expansion of the piston head material, of the component material, or of both materials always leads to the result that the component is constantly pressed against the piston head in firm and planar manner. When the piston cools down, gap formation in the region of the bowl wall or of the bowl base is avoided because of the configuration, according to the invention, of the component in this region.

Advantageous further developments are evident from the dependent claims.

In a particularly preferred further development, the component has a face surface and an outer surface on the top land side, which surfaces run out continuously toward the outside, toward the piston crown, forming an acute angle, and that the face surface is disposed flush with the piston crown. With this measure, gap formation caused by stress due to changes in temperature in the region of the piston crown is additionally prevented.

The bowl wall of the combustion bowl can be formed in part or entirely by the component, depending on the requirements of an individual case.

Preferably, the inner surface on the bowl side makes a transition into the face surface of the component by way of a rounded part. The bowl edge rounding formed in this manner reduces the risk of crack formation in the component in this region, at high temperature stress on the bowl edge.

The component preferably consists of a material based on carbon, such as synthetically produced polygranular carbons or graphites, particularly die-pressed carbons and graphites. This material is not only light but also resistant to changing temperatures.

The piston base body can particularly consist of a light-metal alloy on the basis of aluminum. These materials have a particularly high temperature expansion coefficient, so that the present invention is particularly well suited for these piston types.

Figure 2:
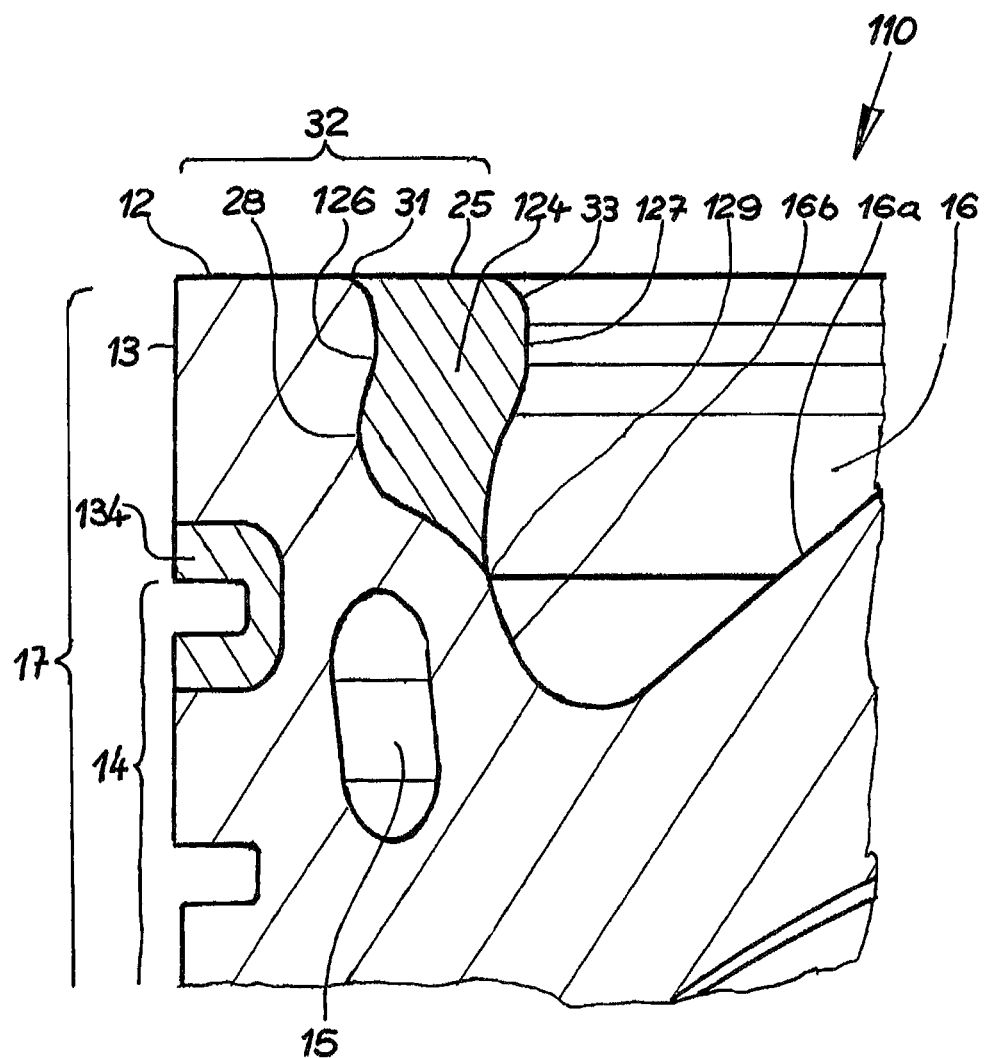

Exemplary embodiments of the present invention will be explained in greater detail below, using the attached drawings. These show, in a schematic representation, not true to scale:

FIG. 1 a first exemplary embodiment of a piston according to the invention, in section;

FIG. 2 a further exemplary embodiment of a piston according to the invention, in an enlarged partial representation, in section.

FIG. 1 shows a first, particularly preferred exemplary embodiment of a piston 10 according to the invention, in section. In the exemplary embodiment, the piston 10 has a one-part piston base body 11, which is produced from a light-metal alloy on the basis of aluminum in the exemplary embodiment. The present invention can, of course, be implemented with all one-part or multi-part piston types. The piston base body 11 has a part 12 of a piston crown, a circumferential top land 13, as well as a circumferential ring belt 14 having ring grooves for accommodating piston rings (not shown). Furthermore, a circumferential cooling channel 15 is provided approximately at the level of the ring belt 14. The piston base body 11 furthermore has the base 16a of a combustion bowl 16. The piston base body 11 thereby forms a large part of the piston head 17 of the piston 10.

The piston base body 11 furthermore forms the piston skirt 21 of the piston 10 according to the invention. The piston skirt 21, in known manner, has pin bosses 22 and pin bores 23 for accommodating a piston pin (not shown).

Furthermore, a ring-shaped component 24 is accommodated in the piston head 17. The component 24 has a face surface 25, an outer surface 26 on the top land side, as well as an inner surface 27 on the bowl side. In the exemplary embodiment, the component 24 is produced, in known manner, from a material based on carbon, such as synthetically produced polygranular carbons or graphites, particularly die-pressed carbons and graphites—defined by a grain size of less than 1000 µm, a fatigue strength of min. 10 MPa, a heat conductivity of 10 to 100 W/mK, a modulus of elasticity of 10 to 20 GPa, and a density of 1.7 to 2.2 g/cm3.

The component 24 is held in the piston head 17 by means of an undercut 28, in such a manner that its inner surface 27 on the bowl side forms the complete bowl wall of the combustion bowl 16 in the exemplary embodiment.

The inner surface 27 of the component 24 on the bowl side runs out flush and continuously with the bowl base 16a of the combustion bowl 16. In this connection, the outer surface 26 on the top land side and the inner surface 27 of the component 24 on the combustion bowl side form a circumferential edge 29 that comes to a point. With this measure, a gap formation in the region of the bowl base 16a, caused by stress due to changes in temperature, is prevented.

In the particularly preferred first embodiment of the piston 10 shown in FIG. 1, the component 24 is disposed in the piston head 17 in such a manner that its face surface 25 and its outer surface 26 on the top land side run out constantly radially outward, with the formation of a circumferential edge 31 that comes to a point. In this connection, the face surface 25 is disposed flush with the part 12 of the piston crown formed by the piston base body 11. The face surface 25 of the component 24 and the part 12 of the piston crown formed by the piston base body 11 thereby form a complete piston crown 32 of the piston 10.

The inner surface 27 of the component 24 on the bowl side makes a transition, in the exemplary embodiment, into the face surface 25 of the component 24, by means of a rounded part 33. The bowl edge rounding formed in this manner reduces the risk of crack formation in the component in this region, under high temperature stress on the bowl edge.

The piston 10 is produced in known manner by means of casting the component 24 into the piston head 17. The gravity casting method used for this purpose brings about the result that no material-fit connection between the piston head 17 and the installed part 24, but rather only a shape-fit and force-fit connection, is produced.

FIG. 2 shows a further preferred embodiment of a piston 110 according to the invention in an enlarged detail representation, in section. The piston 110 essentially corresponds to the piston 10 according to FIG. 1. For this reason, structural elements that are the same are provided with the same reference numbers, and reference is made, in this regard, to the description of FIG. 1.

The essential difference between the piston 10 according to FIG. 1 and the piston 110 according to FIG. 2 consists in that the ring-shaped component 124 has an inner surface 127 on the bowl side, which runs out flush and continuously with a bowl wall 16*b* of the combustion bowl 16. In this connection, the outer surface 126 on the top land side and the inner surface 127 of the component 124 on the bowl side form a circumferential edge 129 that comes to a point. The component 124 thereby forms only a part of the bowl wall of the combustion bowl 16. With this measure, a gap formation in the region of the bowl wall 16*b* caused by stress due to changes in temperature is prevented.

The piston according to FIG. 2 furthermore has a known ring insert element 134.

The invention claimed is:

1. A piston for an internal combustion engine, comprising:
a one-piece piston base body comprising:
a piston crown,
a circumferential top land,
a combustion bowl having a bowl base and a bowl wall,
a ring belt, and
an insert formed from a ring-shaped component, which is held in the piston base body by means of an undercut by force fit and shape fit, wherein the component has a face surface and an outer surface on the top land side and an inner surface on the bowl side, said inner surface running out flush and continuously with the bowl wall or the bowl base, said inner surface on the bowl side and said outer surface on the top land side forming a circumferential edge that tapers to a point that rests on a surface of the piston bowl wall or bowl base,
wherein said face surface and said outer surface on the top land side run out continuously radially outward toward the piston crown, the face surface and outer surface forming a circumferential edge that tapers to a point, and wherein the face surface is disposed flush with the piston crown, and
wherein there is a circumferential cooling channel formed in the piston base body, said circumferential cooling channel being disposed completely below the insert.

2. The piston according to claim 1, wherein the bowl wall of the combustion bowl is formed in part or entirely by the component.

3. The piston according to claim 1, wherein the inner surface on the bowl side makes a transition into the face surface of the component by means of a rounded part.

4. The piston according to claim 1, wherein the component consists of a material on the basis of die-pressed carbon or graphite, defined by a grain size of less than 1000 μm, a fatigue strength of min. 10 MPa, a heat conductivity of 10 to 100 W/mK, a modulus of elasticity of 10 to 20 GPa, and a density of 1.7 to 2.2 g/cm$^3$.

5. The piston according to claim 1, wherein the piston base body consists of a light-metal alloy on the basis of aluminum.

* * * * *